United States Patent
Burcham et al.

(10) Patent No.: US 11,067,411 B1
(45) Date of Patent: Jul. 20, 2021

(54) ROUTE SEGMENTATION ANALYSIS FOR POINTS OF INTEREST

(71) Applicant: T-MOBILE INNOVATIONS LLC, Overland Park, KS (US)

(72) Inventors: Robert H. Burcham, Overland Park, KS (US); Matthew Habiger, Kansas City, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 181 days.

(21) Appl. No.: 16/379,781

(22) Filed: Apr. 9, 2019

(51) Int. Cl.
 *G01C 21/36* (2006.01)
 *G08G 1/01* (2006.01)
 *G01C 21/34* (2006.01)

(52) U.S. Cl.
 CPC ..... *G01C 21/3679* (2013.01); *G01C 21/3423* (2013.01); *G01C 21/3664* (2013.01); *G01C 21/3673* (2013.01); *G08G 1/01* (2013.01)

(58) Field of Classification Search
 CPC .......... G01C 21/3679; G01C 21/3644; G01C 21/3673; G01C 21/3423; G08G 1/01
 See application file for complete search history.

(56) References Cited

U.S. PATENT DOCUMENTS

| | | | |
|---|---|---|---|
| 8,391,836 B1 | 3/2013 | Bolot et al. | |
| 8,589,318 B2 | 11/2013 | Sundararajan et al. | |
| 9,122,693 B2 | 9/2015 | Blom et al. | |
| 9,171,461 B1 | 10/2015 | Dabell | |
| 9,326,096 B1 | 4/2016 | Gatmir-Motahari et al. | |
| 9,710,873 B1 | 7/2017 | Hill | |
| 10,332,151 B2 | 6/2019 | Megdal | |
| 10,469,981 B1 | 11/2019 | Dannamaneni et al. | |
| 10,555,130 B1 | 2/2020 | Burnham et al. | |
| 10,645,531 B1 | 5/2020 | Burcham et al. | |
| 10,657,806 B1 | 5/2020 | Burcham et al. | |

(Continued)

FOREIGN PATENT DOCUMENTS

GB  2516513 A  1/2015

OTHER PUBLICATIONS

FAIPP Pre-Interview Communication dated Jan. 28, 2020, U.S. Appl. No. 15/838,016, filed Dec. 11, 2017.

(Continued)

*Primary Examiner* — Annie Marie Antonucci

(57) ABSTRACT

A method to determine a traffic flow at a point-of-interest (POI). The method comprises presenting a user interface on a display that shows segments overlaid on a map, receiving input that defines a perimeter of a POI, determining route segments contained within the perimeter of the POI, creating a POI object that comprises the identities of the route segments contained within the perimeter of the POI, whereby a geolocation of the POI is defined, for each of a plurality of mobile communication devices, determining route segments traversed by the mobile communication device based on geolocations of the device, and determining a number of different mobile communication devices that intersect with the POI based on comparing the route segments traversed by the mobile communication devices to the route segments associated to the POI object, whereby a traffic flow at the geolocation of the POI is determined.

20 Claims, 5 Drawing Sheets

(56) References Cited

U.S. PATENT DOCUMENTS

| | | |
|---|---|---|
| 10,694,321 B1 | 6/2020 | Burcham et al. |
| 10,715,950 B1 | 7/2020 | Burnham et al. |
| 10,715,964 B1 | 7/2020 | Burnham et al. |
| 2002/0188550 A1 | 12/2002 | Swartz et al. |
| 2004/0254698 A1 | 12/2004 | Hubbard et al. |
| 2006/0100956 A1 | 5/2006 | Ryan et al. |
| 2007/0191029 A1* | 8/2007 | Zarem .................. G09B 29/106 455/456.5 |
| 2008/0201305 A1 | 8/2008 | Fitzpatrick et al. |
| 2009/0150217 A1 | 6/2009 | Luff |
| 2009/0319177 A1 | 12/2009 | Khosravy et al. |
| 2010/0094867 A1 | 4/2010 | Badros et al. |
| 2010/0279708 A1 | 11/2010 | Lidsrom et al. |
| 2012/0008526 A1 | 1/2012 | Borghei |
| 2012/0040637 A1 | 2/2012 | Wigren |
| 2013/0267255 A1 | 10/2013 | Liu et al. |
| 2014/0122220 A1 | 5/2014 | Bradley et al. |
| 2015/0029176 A1 | 1/2015 | Baxter et al. |
| 2015/0051829 A1* | 2/2015 | Gearhart ............ G01C 21/3682 701/467 |
| 2015/0081617 A1 | 3/2015 | Shaik et al. |
| 2015/0088423 A1 | 3/2015 | Tuukkanen |
| 2015/0106011 A1 | 4/2015 | Nesbitt |
| 2015/0146917 A1 | 5/2015 | Bernal et al. |
| 2015/0149285 A1 | 5/2015 | Schroeter |
| 2015/0201298 A1 | 7/2015 | Zhang et al. |
| 2015/0204680 A1 | 7/2015 | Lee et al. |
| 2015/0278868 A1 | 10/2015 | O'Connor et al. |
| 2015/0382139 A1* | 12/2015 | Omar .................... G01S 5/0294 455/456.1 |
| 2016/0076908 A1 | 3/2016 | Pang et al. |
| 2016/0330589 A1 | 11/2016 | Tuukkanen |
| 2016/0367899 A1 | 12/2016 | Boncyk |
| 2017/0153113 A1 | 6/2017 | Gotoh et al. |
| 2017/0187788 A1* | 6/2017 | Botea .................. H04L 67/1002 |
| 2017/0213240 A1 | 7/2017 | Waldron et al. |
| 2017/0223497 A1 | 8/2017 | Wang |
| 2017/0277716 A1* | 9/2017 | Giurgiu ............... G06F 16/2365 |
| 2018/0240026 A1* | 8/2018 | Pietrobon ............ G08G 1/0133 |
| 2018/0259356 A1 | 9/2018 | Rolf et al. |
| 2018/0266829 A1 | 9/2018 | Frtiz et al. |
| 2018/0283896 A1 | 10/2018 | Piemonte et al. |
| 2018/0330403 A1 | 11/2018 | Olivieri |
| 2019/0220898 A1 | 7/2019 | Rhodes et al. |

OTHER PUBLICATIONS

Restriction Requirement dated Feb. 21, 2020, U.S. Appl. No. 15/838,016, filed Dec. 11, 2017.
FAIPP Office Action dated Nov. 13, 2019, U.S. Appl. No. 16/398,258, filed Apr. 29, 2019.
Restriction Requirement dated Nov. 15, 2019, U.S. Appl. No. 16/398,254, filed Apr. 29, 2018.
Notice of Allowance dated Jan. 10, 2020, U.S. Appl. No. 16/398,254, filed Apr. 29, 2018.
Notice of Allowance dated Oct. 2, 2019, U.S. Appl. No. 16/379,784, filed Apr. 9, 2019.
Notice of Allowance dated Jan. 17, 2020, U.S. Appl. No. 16/379,786, filed Apr. 9, 2019.
Notice of Allowance dated Feb. 18, 2020, U.S. Appl. No. 16/379,798, filed Apr. 9, 2019.
Burcham, Robert H., et al., "Pre-processing of Mobile Communications Device Geolocations According to Travel Mode in Traffice Analysis," filed Dec. 13, 2019, U.S. Appl. No. 16/714,277.
Restriction Requirement dated Jan. 23, 2019, U.S. Appl. No. 15/944,512, filed Apr. 3, 2018.
FAIPP Pre-Interview Communication dated May 28, 2019, U.S. Appl. No. 15/944,512, filed Apr. 3, 2018.
Notice of Allowance dated Jul. 10, 2019, U.S. Appl. No. 15/944,512, filed Apr. 3, 2018.
FAIPP Pre-Interview Communication dated Aug. 28, 2019, U.S. Appl. No. 16/398,258, filed Apr. 29, 2019.
Dannamaneni, Prashanth, et al., "Mobile Phone Mobile Viewshed Analysis," filed Apr. 3, 2018, U.S. Appl. No. 15/944,512.
Burcham, Robert H., et al., "Adapting Content Presentation Based on Mobile Viewsheds," filed Dec. 11, 2017, U.S. Appl. No. 15/838,016.
Bobe, Brooke M., et al., "Mobile Communication Device Locations Data Analysis Supporting Build-Out Decisions", Filed Apr. 9, 2019, U.S. Appl. No. 16/379,774.
Burcham, Robert, H., et al., "Route Building Engine Tuning Framework", filed Apr. 29, 2019, U.S. Appl. No. 16/398,254.
Burcham, Robert H., et al. "Point of Interest (POI) Definition Tuning Framework" filed Apr. 29, 2019, U.S. Appl. No. 16/398,258.
Burcham, Robert H., et al., "Pre-processing of Mobile Communications Device Geolocations According to Travel Mode in Traffice Analysis," filed Apr. 9, 2019, U.S. Appl. No. 16/379,784.
Burcham, Robert H., et al., "Transformation of Point of Interest Geometries to Lists of Route Segments in Mobile Communication Device Traffic Analysis," filed Apr. 9, 2019, U.S. Appl. No. 16/379,786.
Burcham, Robert H., et al., "Pattern Matching in Point-of-Interest (POI) Traffic Analysis," filed Apr. 9, 2019, U.S. Appl. No. 16/379,789.
Office Action dated Apr. 15, 2020, U.S. Appl. No. 15/838,016, filed Dec. 11, 2017.
Final Office Action dated Jul. 28, 2020, U.S. Appl. No. 15/838,016, filed Dec. 11, 2017.
Notice of Allowance dated Mar. 16, 2020, U.S. Appl. No. 16/714,277 filed Dec. 13, 2019.
Burcham, Robert H., et al., "Pattern Matching in Point-of-Interest (POI) Traffic Analysis," filed Apr. 28, 2020, U.S. Appl. No. 16/860,719.
Notice of Allowance dated Mar. 12, 2020, U.S. Appl. No. 16/398,258, filed Apr. 29, 2019.

* cited by examiner

ROUTE SEGMENTATION ANALYSIS FOR POINTS OF INTEREST

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Geolocations of mobile communication devices can serve as proxies for geolocations of human beings. By determining the geolocation of mobile communication devices at specific times, storing this time-associated geolocation data in a data store, and analyzing the geolocation data, a variety of useful information can be generated. For example, a rate of human beings traversing an area at specific times of day and days of the week can be inferred. A speed of human beings (e.g., the cars which the human beings are driving or riding in) traversing an area can be inferred.

SUMMARY

In an embodiment, a geolocating method of promoting a user defining a geolocation of a point-of-interest (POI) as a collection of route segments, determining route segments traversed by a plurality of mobile communication devices based on geolocations of the devices, and analyzing the intersections of the route segments of the defined POIs and the route segments traversed by the mobile communication devices to determine a traffic flow at the geolocation of the POI is disclosed. The method comprises storing a map of travel routes in a first data store, where each travel route comprises a plurality of abutting route segments, presenting a user interface on a display screen by a point-of-interest (POI) definition application executing on a computer system, where the user interface shows at least some of the route segments overlaid on a map identifying street names and directions, and receiving input by the POI definition application that defines a perimeter of a POI. The method further comprises determining by the POI definition application route segments contained within the perimeter of the POI, creating a POI object by the POI definition application that comprises the identities of the route segments contained within the perimeter of the POI, whereby a geolocation of the POI is defined, presenting in the user interface on the display screen by the POI definition application the route segments associated with the POI object with an appearance that contrasts with other route segments, and receiving input by the POI definition application that defines a numeric weight for at least some of the route segments associated with the POI object. The method further comprises storing the numeric weights in the POI object by the POI definition application, associating each numeric weight to a corresponding route segment identity and storing the POI object by the POI definition application in a second data store. The method further comprises, for each of a plurality of mobile communication devices, determining route segments traversed by the mobile communication device based on geolocations of the device by an analysis application executing on a computer system, reading the POI object by the analysis application from the second data store and determining by the analysis application a number of different mobile communication devices that intersect with the POI based on comparing the route segments traversed by the mobile communication devices to the route segments associated with the POI object and based on the numeric weights associated to the identities of the route segments in the POI object, whereby a traffic flow at the geolocation of the POI is determined.

In another embodiment, a geolocating system that promotes a user defining a geolocation of a point-of-interest (POI) as a collection of route segments, determines route segments traversed by a plurality of mobile communication devices based on geolocations of the devices, and analyzes the intersections of the route segments of the defined POIs and the route segments traversed by the mobile communication devices to determine a traffic flow at the geolocation of the POI is disclosed. The system comprises at least one processor, a non-transitory memory, a point-of-interest (POI) definition application stored in the non-transitory memory, and an analysis application stored in the non-transitory memory. When executed by the at least one processor, the POI definition application presents a user interface on a display screen, where the user interface shows at least some of the route segments overlaid on a map identifying street names and directions, receives input that defines a perimeter of a POI, determines route segments contained within the perimeter of the POI, creates a POI object that comprises the identities of the route segments contained within the perimeter of the POI, whereby a geolocation of the POI is defined, and stores the POI object in the data store. When executed by the at least one processor, the analysis application, for each of a plurality of mobile communication devices, determines route segments traversed by the mobile communication device based on geolocations of the device, reads the POI object from the data store, and determines a number of different mobile communication devices that intersect with the POI based on comparing the route segments traversed by the mobile communication devices to the route segments associated to the POI object, whereby a traffic flow at the geolocation of the POI is determined.

In yet another embodiment, a geolocating method of promoting a user defining a geolocation of a point-of-interest (POI) as a collection of route segments, determining route segments traversed by a plurality of mobile communication devices based on geolocations of the devices, and analyzing the intersections of the route segments of the defined POIs and the route segments traversed by the mobile communication devices to determine a traffic flow at the geolocation of the POI is disclosed. The method comprises storing a map of travel routes in a first data store, where each travel route comprises a plurality of abutting route segments, presenting a user interface on a display screen by a point-of-interest (POI) definition application executing on a computer system, where the user interface shows at least some of the route segments overlaid on a map identifying street names and directions, receiving input by the POI definition application that defines a perimeter of a POI, and determining by the POI definition application route segments contained within the perimeter of the POI. The method further comprises creating a POI object by the POI definition application that comprises the identities of the route segments contained within the perimeter of the POI, whereby a geolocation of the POI is defined, and storing the POI object by the POI definition application in a second data store. The method further comprises, for each of a plurality of mobile communication devices, determining route segments traversed by the mobile communication device based on geolocations of the device by an analysis application executing on a computer system, reading the POI object by the analysis application from the second data store, and determining by the analysis application a number of different mobile communication devices that intersect with the POI based on comparing the route segments traversed by the mobile communication devices to the route segments associated to the POI object, whereby a traffic flow at the geolocation of the POI is determined.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
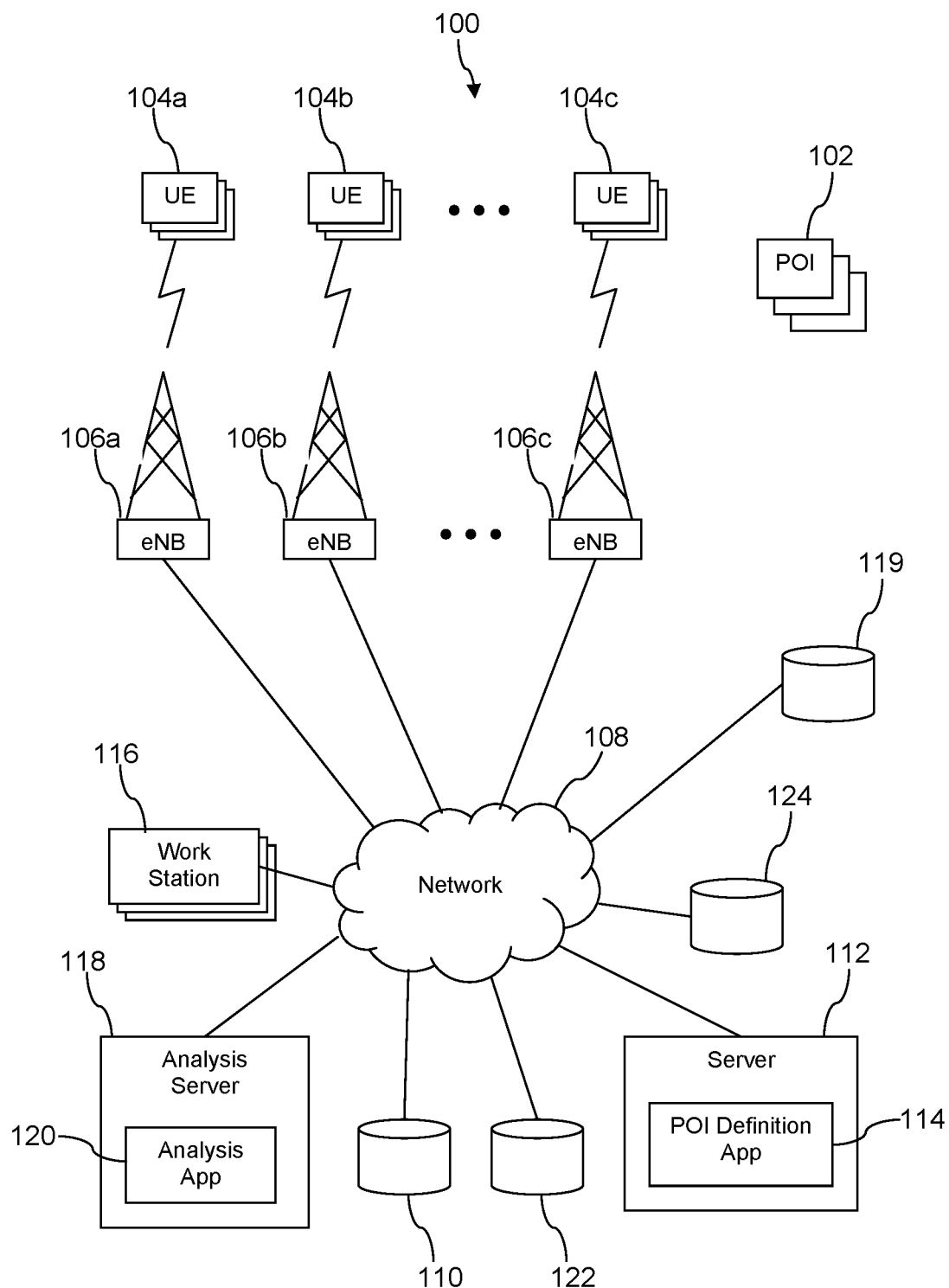
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Geolocation data pertaining to mobile communication devices can be collected by wireless communication service providers and analyzed to derive valuable information on the presence, dwell times, and movements of human beings. This information can be used to plan and adapt highway systems, construction plans, and business plans. This information can be used to establish values and prices for presenting content on billboards and on digital screens outside of the home. It is observed that in such analysis, the geolocation of the mobile communication device serves as a proxy for the geolocation of the human being.

The geolocation data associated with a single mobile communication device can be analyzed to determine a travel route that the user of the device traverses, for example when commuting from home to work and/or when commuting from work to home. This analysis may rely on one or more digital map of existing roads and may snap geolocation data to the nearest road. In an embodiment, the digital map may represent roads or routes as a sequence of route segments that abut one another. For example a first end of a first route segment abuts a first end of a second route segment, a second end of the second route segment abuts a first end of a third route segment, a second end of the third route segment abuts a first end of a fourth route segment, etc. In an embodiment, these route segments may comprise mathematical abstractions or computer representations referred to as edges and vertices (route segments abut one another at the vertices). The route of the single mobile communication device can then be represented as a sequence of route segments. To determine if the device (and the associated human user) passes through or next to a point-of-interest (POI)—which may be referred to herein as an intersection of the device with the POI—a geolocation and an orientation of the POI may be analyzed with reference to the sequence of route segments traversed by the device. This determination that was described above for the route of one mobile communication device intersecting with one POI may be carried out by applications executing on computer systems daily for tens of millions of devices and for hundreds of thousands of different POIs.

A determination of intersections of devices with POIs on a national scale may consume about 6 hours of computing time in a given computer system, where the geolocations of the POIs are defined using customary geolocation coordinates, for example defined by latitude-longitude pairs. This kind of definition of geolocations of the POIs may further involve defining a geometry around the point of the latitude-longitude pairs that the POI includes, for example from the consideration of what points a driver or rider in a vehicle may be able to observe and experience an advertisement presented on a large billboard beside a roadway. The present disclosure teaches a system and method of performing these intersection determinations based on defining the POIs in terms of a collection of route segments. By defining the POIs as a delimited collection of route segments, the intersection algorithm can move away from geometrical and mathematical operations to simpler and quicker database look-up and comparison operations. Said in other words, by defining POIs as a collection of route segments, intersection analysis can be transformed from processor intensive mathematics to simple database look-ups, for example a database join function call based on route segment identity. It is expected that using this approach can reduce the same determination of intersections of devices with POIs on a national scale on the same given computer system to 3 hours or less of computing time, achieving a significant time savings. This increased computing efficiency may save operating costs (e.g., cloud computing resources are often priced in part based on time measured consumption of resources), save electrical power, and also permit applications that are infeasible under slower computation cycles.

The system comprises a POI definition application that provides a user interface for use in defining POIs. A map of travel routes comprising a plurality of route segments is stored in a data store. The POI definition application accesses the data store, reads at least some of the map information, and presents a map which can be zoomed into and zoomed out of by a user accessing the POI definition application on a laptop computer, for example via a web browser executing on the laptop computer. The presentation shows route segments overlaid on top of or superimposed on top of a depiction of streets and light rail lines. The presentation may show the names of streets for reference by users. The user can provide input to the user interface to draw a perimeter around a location which he or she deems to be the area of the POI. The POI definition application uses the perimeter drawn around the POI to determine what route segments lay wholly and/or partially within the perimeter.

The POI definition application creates a POI definition object that comprises one or more entries, each entry identifying one of the route segments selected by the user input. The entry may further identify a tile within which the route segment is located. A tile may be an area partition that provides computing efficiency gains by restricting intersection calculations to areas smaller than the entire United States, smaller than the entire state of Kansas, smaller than an entire county. In an example, a tile may define about a 5 square mile area. Tile sizes may vary depending on a density of POIs within the tiles and/or of population.

The presentation in the user interface may show the route segments that are included in the POI definition object in a color or line style that contrasts with other route segments in the presentation screen which are not included in the POI definition object. The user interface and the POI definition application may provide a functionality to select route segments initially included in the POI definition object for removal from the definition. The user interface and the POI definition application may provide a functionality to select route segments initially excluded from the POI definition object for inclusion in the definition. This may be considered to be a POI definition tuning functionality or a POI definition curating functionality.

The POI definition application may further provide a function to promote the user assigning weighting to route segments that are part of the POI definition object. The weighting of route segments may be used by an analysis application to assign fractional intersection values to mobile communication devices that traverse a route segment in the POI definition object that has a fractional weighting. A fractional weighting may be assigned to adapt for environmental considerations, such as a one-way street proximate to a billboard but where traffic is flowing away from the billboard. The weighting of route segments in the POI definition object may be initialized to a default value of 1 or some other numerical value. Fractional weightings can be provided to some or all of the route segments manually by the user.

An analysis application may execute to analyze the geolocation data associated with a large number of mobile communication devices and determine route segments these devices traverse. This analysis can take account of the timestamps or time-date values included in geolocation data of the mobile communication devices. The analysis application may analyze the geolocation data of the devices daily or on some other periodic schedule. The analysis application may then compare the route segments traversed by a mobile communication device to one or more POI definition objects to see if any of the route segments included in a POI definition object matches a route segment traversed by the mobile communication device. When such a match occurs, an intersection or a fractional intersection is deemed to have occurred between the mobile communication device (and the associated human being) and the POI. The analysis application can count the total of all such intersections of devices with a POI and create totals per units of time (daily counts, hourly counts) and can determine rates of intersections over units of time.

In addition to achieving significant computing efficiencies, the definition of POIs in terms of route segments and in terms of weighting values provides the benefit of being more intuitive and user friendly for users to use, for example by making it easier for users to visualize the POI when it is presented as a plurality of route segments on a map. Some users or organizations that may benefit from use of this system of determining intersections of mobile communication device geolocations (and the inferred geolocations of human beings) with the geolocation of a POI may not be deeply technical and may have difficulty defining their POI geolocation in terms of latitude-longitude coordinates and an enclosing geometry. The system of the geolocation of the POI described is hoped to promote the wider adoption and use of this system.

In an embodiment, a user may use the intersection results produced by the analysis application to tune the POI definition objects using the POI definition application user interface. For example, if the intersection results are too small in number (actual marketing results achieved bespeak the likelihood of a higher number of intersections), the user may increase fractional weightings of route segments included in the POI definition object and/or add additional route segments to the POI definition object.

Calculating intersections of route segments traversed by a mobile communication device with POIs defined as a delimited set of route segments provides considerable computing efficiency as contrasted with determining intersections of route segments with POIs defined as latitude-longitude pairs coupled with an enclosing perimeter. This increased processing efficiency may make it feasible to process historic device location data reaching back months for new partners (e.g., bringing on-board a new POI proprietor) to provide retrospective insight into traffic at their location. Further, this increased computing efficiency also enables the iterative tuning of POI definitions, because the re-computation—once the route traversed by a mobile communication device has been defined in terms of route segments—is a mere data store lookup versus the new definition of the POI in terms of route segments. It is pointed out that if the change in POI definition is restricted to changing weightings, yet further efficiency may be attained, as the identification of intersections of route segments of the POI with the route segments traversed have been identified, they may simply be rescored according to the new weights.

Turning now to FIG. 1, a system 100 is described. In an embodiment, the system 100 comprises a plurality of points-of-interest (POIs) 102, a first plurality of mobile communication devices (UEs) 104a, a second plurality of UEs 104b, and a third plurality of UEs 104c. The POIs 102 may be associated with buildings, sports venues, billboards, or display screens on a subway wall. The first plurality of UEs 104a may establish a wireless communication link to a first cell site 106a that communicatively couples the UEs 104a to a network 108. The second plurality of UEs 104b may establish a wireless communication link to a second cell site 106b that communicatively couples the UEs 104b to the network 108. The third plurality of UEs 104c may establish a wireless communication link to a third cell site 106c that communicatively couples the UEs 104c to the network 108. The UEs 104 may be any of a mobile phone, a smart phone, a personal digital assistant (PDA), a wearable computer, a headset computer, a laptop computer, a notebook computer, or a tablet computer. The network may be one or more private networks, one or more public networks, or a combination thereof.

Geolocation information associated with the UEs 104 may be collected and stored in a location data store 119. Some of the geolocation information may be provided by at least some of the UEs 104 through self-locating, for example using a GPS receiver on a UE 104 and sending GPS location coordinates to the location data store 119. Some of the geolocation information may be provided by the cell sites 106, for example providing the geolocation of a cell site 106 as a proxy for the geolocation of a UE 104 attached via a wireless link to the cell site 106. Some of the geolocation information may be provided by trilateration techniques, for example by analyzing signal strengths of a radio signal emitted by a UE 104 received by a plurality of cell sites 106 at known geolocations. The geolocation information associated with the UEs 104 may be referred to in some contexts as location fixes of the UEs 104. The geolocation information associated with a UE 104 may be deemed a proxy for geolocation information on a user of the UE 104, for example a wireless communication service subscriber. The geolocation information is stored in the location data store 119 as a geolocation along with an associated timestamp (date and time) identifying when the UE 104 was determined or inferred to be at the geolocation. In some contexts herein, when geolocation information is referred to both the geolocation and an associated timestamp are referenced. In other contexts—for example when discussing definitions of POIs—when geolocation information is referred to only a geolocation and not an associated timestamp is referenced. The geolocation may be identified with latitude-longitude values, with a geohash value, or with another location identity system.

This geolocation information associated with the UEs 104 may desirably be analyzed to determine proximity of the UEs 104 to the POIs 102. For example, analysis may be able to determine how many UEs 104 passed within eyesight of a POI 102 (e.g., a digital billboard). Analysis may be able to determine how long on average UEs 104 dwell in proximity to a POI 102 (e.g., a restaurant in an office building). This analysis can be summarized in statistics that are segmented by time slots, for example hourly time slots or half-hour time slots. The presence of a UE 104 proximate to a POI 102 may be referred to as an intersection of the UE 104 with the POI 102.

The system 100 further comprises one or more work stations 116 and an analysis server 118 that executes an analysis application 120 that analyzes the geolocation data associated with the UEs 102 (e.g., location fixes of the UEs 102) stored in the location data store 119. The work stations 116 and the analysis server 118 may be implemented as computer systems. Computer systems are described further hereinafter.

In embodiment, when the UE 104 is moving on a road or on a light rail line there may be an insufficient number of location fixes in the location data store 119 to smoothly trace the route followed by the UE 104, for example from a residence to a work place. The analysis application 120 may access a digital map data store 110 to read one or more digital maps of existing roads, light rail tracks, or footpaths. The analysis application 120 may then infer a route taken by the UE 104 from a first geolocation to a second geolocation by imputing the unknown path taken by the UE 104 to be an algorithmically selected route in the digital map that connects the two geolocations. The first geolocation and the second geolocation may each separately be determined by the analysis application 120 as a centroid of a plurality of geolocations that are located close to each other. For example, when a user is at work during a workday, a plurality of geolocations may be captured and stored in the location data store 119, where the geolocations are located close to each other (e.g., within 200 feet of each other). For example, when a user is at home after work, a plurality of geolocations may be captured and stored in the location data store 119, where the geolocations are located close to each other. In some contexts, the plurality of geolocations located close to each other (e.g., within a predefined radius of the centroid, for example a radius of 300 feet or a radius of 1000 feet) may be referred to as a cluster of location fixes or as simply a cluster. The first geolocation may be defined by the geolocation of the centroid of a first cluster of location fixes of a UE 104 and the second geolocation may be defined by the geolocation of the centroid of a second cluster of location fixes of the same UE 104. The timestamp associated with the first geolocation may be a latest timestamp of the location fixes associated with the first cluster, and the timestamp associated with the second geolocation may be the earliest timestamp of the location fixes associated with the second cluster. Alternatively, the timestamp associated with the first geolocation may be an earliest timestamp of the location fixes associated with the first cluster, and the timestamp associated with the second geolocation may be the latest timestamp of the location fixes associated with the second cluster.

This imputed route may be algorithmically selected based at least in part on identifying a shortest path between actual geolocation data points or location fixes (or cluster centroids), for example using an open source routing machine. Imputing the route comprises imputing the actual geolocations to a route, even though the actual geolocation may not be located on a route. This may be referred to in some contexts as snapping the geolocation to a route. The geolocation may not actually be on a route because the geolocation location information is imprecise (e.g., the UE 104 was on a route, but the location information has a 50 yard error which places it off the route) or because the UE 104 was not on a route (e.g., the UE 104 was in an NFL stadium not physically on a roadway).

Based on the actual geolocations and a time stamp associated with the actual geolocation for the UE 104 (or the centroid and timestamp of a cluster of geolocations of the UE 104), inferred geolocations of the UE 104 between the two actual geolocations and along the imputed route can be determined and associated to a time stamp by the analysis application 120, and an inferred rate of travel between the two actual geolocations can be determined. These inferred geolocations can be stored in the location data store 119 and used along with actual geolocations by the analysis application 120. This process of determining inferred geolocations can be performed for any number of UEs 104. In an embodiment, the process of determining inferred geolocations for UEs 104 may be performed daily. For more details on location clusters and inferring geolocations and/or location fixes of the UE 104, see U.S. patent application Ser. No. 15/944,512 filed Apr. 3, 2018, titled "Mobile Viewshed Analysis," by Prashanth Dannamaneni, et al, which is incorporated herein by reference in its entirety.

In an embodiment, the digital maps stored in the digital map data store 110 may represent roads or routes as a sequence of route segments that abut one another. For example a first end of a first route segment abuts a first end of a second route segment, a second end of the second route segment abuts a first end of a third route segment, a second end of the third route segment abuts a first end of a fourth route segment, etc. In an embodiment, these route segments may comprise mathematical abstractions or computer representations referred to as edges and vertices (route segments abut one another at the vertices). A route traversed by a UE 104 can then be represented as a sequence of route segments.

To determine if the device (and the associated human user) passes through or next to a point-of-interest (POI)—which may be referred to herein as an intersection of the device with the POI—the analysis application 120 can analyze a geolocation and an orientation of the POI with reference to the sequence of route segments traversed by the device. This determination that was described above for the route of one mobile communication device intersecting with one POI may be carried out by the analysis application 120 daily for tens of millions of devices and for hundreds of thousands of different POIs. To support efficient and accurate analysis of UE 104 intersections with POIs 102, the present disclosure teaches providing a tool for defining a POI 102 as a collection of one or more route segments.

The system 100 further comprises a server 112 and a POI definition application 114. The server 112 may be implemented as a computer system. In an embodiment, the POI definition application 114 and the analysis application 120 may execute on the same computer system. The POI definition application provides a user interface (UI) that may be presented on a display of a work station 116 for use in defining a POI. In an embodiment, the UI may be a web page presented in a browser executing on the work station 116, and the POI definition application 114 may be implemented as a web application. The UI may present a plurality of route segments of a digital map overlaid on an image representing streets, railway lines, footpaths, and/or sidewalks along with identifying names. The UI may promote a user drawing a closed figure on the display to represent the perimeter of a POI, for example to represent a region or area from which a billboard may be visible. This drawing input (e.g., POI perimeter demarcation) may be transmitted from the workstation 116 to the POI definition application 114 via the network 108.

The POI definition application 114 determines which of the route segments in the digital map are contained within the drawing input (e.g., within the POI perimeter demarcation) and adds those route segments to a POI definition object. Alternatively, the POI definition application 114 determines which of the route segments are wholly or partially contained within the drawing input and adds those route segments to the POI definition object. The POI definition application 114 then presents the route segments that it added to the POI definition object on the display of the work station 116 with an appearance that contrasts with other route segments that are not part of the POI definition object. For example, the route segments in the POI definition object may be presented in a different color, in a brighter tone, and/or in a different pattern (e.g., a dotted line). The POI definition application 114 stores the POI definition object in a POI definition data store 122. In an embodiment two or more of the digital map data store 110, the location data store 119, and the POI definition data store 122 may be combined in the same data store.

In an embodiment, the user may be able to use one function of the UI to select and click on additional route segments to manually add them to the POI definition object and to use another function of the UE to select and click on route segments to manually remove them from the POI definition object. This process may be referred to in some contexts as curating the POI definition. The ability to curate the POI definition may promote a user differentiating POI definition between different route modes, for example between highway mode, light rail mode, and footpath mode.

Alternatively, the UI and the POI definition application 114 may allow the user of the work station 116 to initially define the POI 102 by drawing a highway mode perimeter, a light rail mode perimeter, and a footpath mode. The digital maps would distinguish between route segments that are highway mode, route segments that are light rail mode, and route segments that are foot path mode. Alternatively, different digital maps may be provided for different route modes. The POI definition application 114 would then include highway mode route segments that are either fully or partially within the highway mode perimeter, light rail mode route segments that are either fully or partially within the light rail mode perimeter, and foot path mode route segments that are either fully or partially within the foot path mode perimeter in the POI definition object.

Curation of the POI definition can include causing the analysis application 120 to analyze UE 104 intersections with the POI 102, to derive statistics on those intersections, and to present the statistics in the display of the UI of the work station 116. After reviewing the statistics presented in the UI, the user may use the UI to adapt the POI definition by adding some route segments and/or deleting other route segments from the POI definition object. This process may be repeated as often as desired to curate the POI definition.

Figure 2:
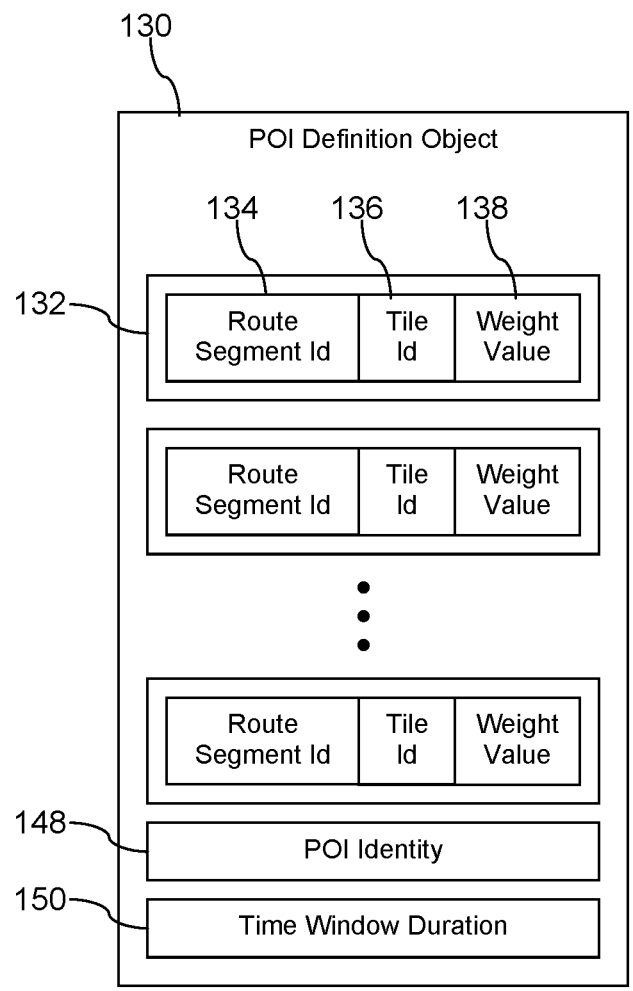
FIG. 2 is a block diagram of a point-of-interest definition object data structure according to an embodiment of the disclosure.

Turning now to FIG. 2, a block diagram of a POI definition object 130 is described. In an embodiment, the POI definition object 130 comprises a plurality of route segment entries 132. Each route segment entry 132 comprises a route segment identity 134. The route segment entry 132 may optionally further comprise a weight value 138. The route segment entry 132 may optionally further comprise a tile identity 136. The POI definition object 130 may further comprise a POI identity 148 and an optional time window duration 150.

In an embodiment, the analysis of intersection of geolocations of UEs 104 with POIs 102 may be performed based on partitioning a large region (e.g., the United States) into a plurality of geographic tiles. Geographic tiles may be defined as regions of 100 square miles or less, regions of 25 square miles or less, regions of 10 square miles or less, or regions of 5 square miles or less. The analysis application 120 may determine what geographic tiles the POI 102 is contained within, based on the geographic tiles the route segment identification 134 of the POI definition object 130 are associated with. The analysis application 120 may then access geolocation data of one or more UE 104 from the location data store 119 selecting those geolocation data entries that are associated with one of the geographic tiles associated with the POI 102. The analysis application 120 then analyzes this restricted population of geolocation data entries for possible intersections with the route segments of the POI definition object 130, whereby the computational magnitude of the analysis is constrained and made more efficient.

An intersection of a geolocation—either an actual geolocation or an inferred geolocation—is deemed to occur when a geolocation of the UE 104 is located on the same route segment as one of the route segment entries 132 of the POI definition object 130. In calculating counts of intersections of UEs 104 with the POI 102, the analysis application 120 may exclude all but one intersection of a given UE 104 with the same POI 102, for example within a predefined time window. Thus, three intersections of a UE 104 with a POI 102 within 20 seconds would be deemed a single intersection which lasted about 20 seconds. Other predefined time windows may be used in determining counts of intersections of UEs 104 with a POI 102. In an embodiment, the user may define the value of the time window duration via the user interface of the POI definition application 114, and the value of the time window duration may be stored in the time window duration 150 parameter of the POI definition object 130 for use in excluding duplicate intersections from an intersection count.

In counting intersections of UEs 104 with POIs 102, it may be desirable to take account of fractional intersections.

A fractional intersection may be deemed to occur when it is uncertain whether an intersection may have the full effect of a normal intersection. For example, if a route is oriented tangential to a POI 102, the chances that a user of the UE 104 sees a billboard associated with the POI 102 may be reduced relative to the case where the route is oriented directly towards the POI 102. Fractional intersection calculations are supported by the weighting value 138 of the route segment entries 132 of the POI definition object 130. The user of the work station 116 may adapt the weight values 138 of the route segment entries 132 of a POI definition object 130 to adjust the intersection statistics of the POI 102 based on his or her expectation of intersection results or based on traffic flow at the POI 102 obtained from other sources, such as government highway traffic statistics. The results of analysis by the analysis application 120, for example counts of intersections and/or statistics about counts of intersections, may be stored in a results data store 124.

Figure 3A:
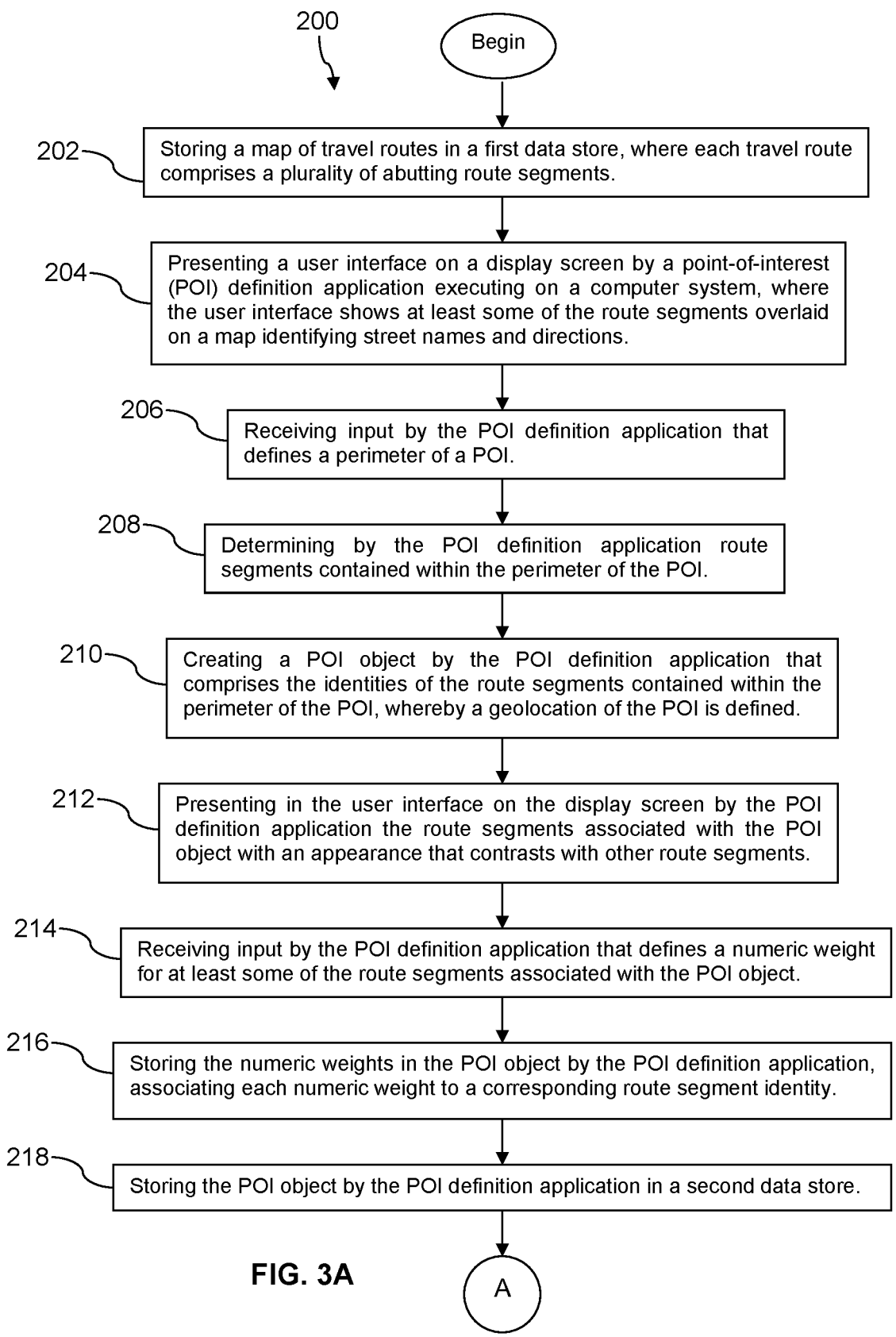
FIG. 3A and FIG. 3B are a flow chart of a method according to an embodiment of the disclosure.
Figure 3B:
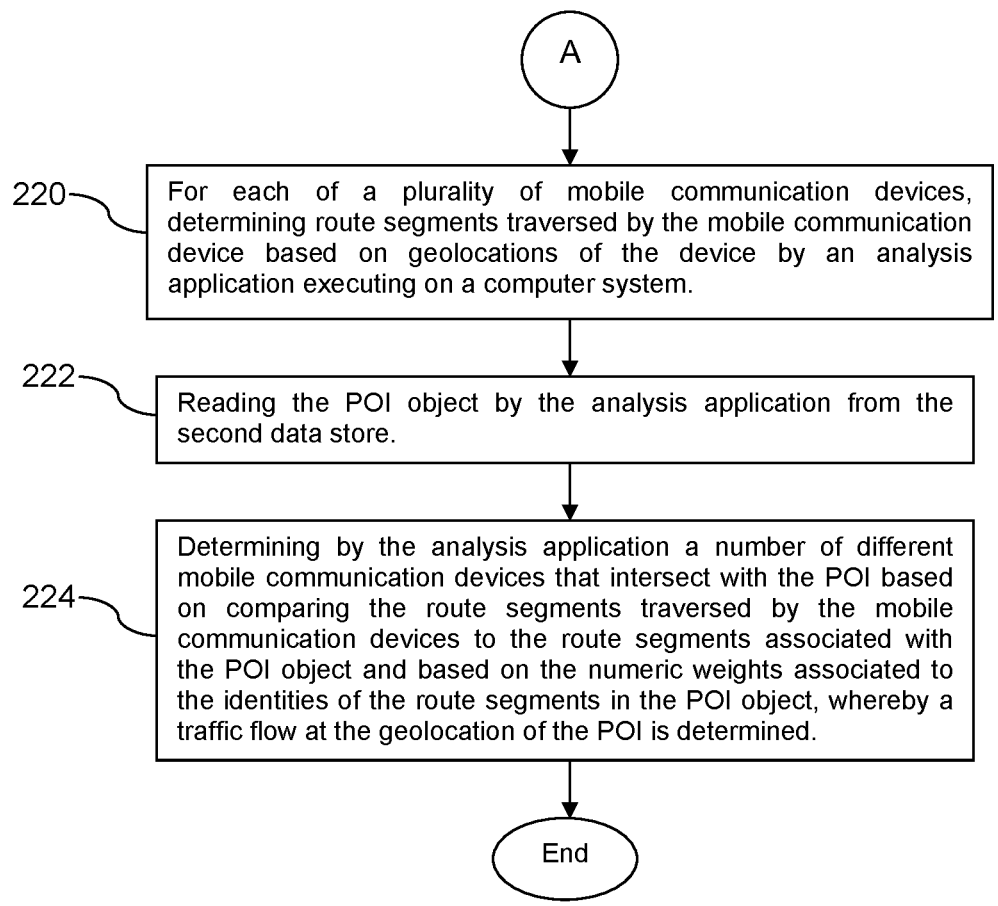

Turning now to FIG. 3A and FIG. 3B, a method 200 is described. In an embodiment, method 200 is a geolocating method of promoting a user defining a geolocation of a point-of-interest (POI) as a collection of route segments, determining route segments traversed by a plurality of mobile communication devices based on geolocations of the devices, and analyzing the intersections of the route segments of the defined POIs and the route segments traversed by the mobile communication devices to determine a traffic flow at the geolocation of the POI. The traffic flow may be determined as a count of intersections of UEs 104 with a POI 102, for example a number of intersections of UEs 104 with a POI 102 per unit of time.

At block 202, the method 200 comprises storing a map of travel routes in a first data store, where each travel route comprises a plurality of abutting route segments. In an embodiment, these route segments may comprise mathematical abstractions or computer representations referred to as edges and vertices (route segments abut one another at the vertices). In an embodiment, the processing of block 202 may comprise storing a plurality of maps in the first data store, for example storing a plurality of digital maps in the digital map data store 110. Each of the plurality of digital maps may cover a different sub-region of a larger region. For example, the digital maps may comprise a plurality of state digital maps that collectively compose a digital map of the United States. For example, the digital maps may comprise an east coast digital map, a mid-west digital map, a southern digital map, a mountain region digital map, a southwest coast digital map, and a northwest digital map that collectively compose a digital map of the United States.

At block 204, the method 200 comprises presenting a user interface on a display screen by a point-of-interest (POI) definition application executing on a computer system, where the user interface shows at least some of the route segments overlaid on a map identifying street names and directions. The user interface may provide functionality for a user to identify a state, a city, or a town as a center of the display and to zoom into the map (to make features bigger to cover less territory) and to zoom out of the map (to make features smaller to cover more territory). The route segments may be presented in different formats to distinguish highway route mode portions from light rail route mode portions from foot path mode portions.

At block 206, the method 200 comprises receiving input by the POI definition application that defines a perimeter of a POI. At block 208, the method 200 comprises determining by the POI definition application route segments contained within the perimeter of the POI.

At block 210, the method 200 comprises creating a POI object by the POI definition application that comprises the identities of the route segments contained within the perimeter of the POI, whereby a geolocation of the POI is defined. In some contexts, the POI object is referred to as a POI definition object. At block 212, the method 200 comprises presenting in the user interface on the display screen by the POI definition application the route segments associated with the POI object with an appearance that contrasts with other route segments.

At block 214, the method 200 comprises receiving input by the POI definition application that defines a numeric weight for each of the route segments associated with the POI object. At block 216, the method 200 comprises storing the numeric weights in the POI object by the POI definition application, associating each numeric weight to a corresponding route segment identity.

At block 218, the method 200 comprises storing the POI object by the POI definition application in a second data store. At block 220, the method 200 comprises, for each of a plurality of mobile communication devices, determining route segments traversed by the mobile communication device based on geolocations of the device by an analysis application executing on a computer system. The processing of block 220 comprises reading geolocation data from the location data store 119. The geolocation data read from the location data store 119 may be selected based on a tile or plurality of tiles that are associated with the route segments identified in the POI object. At block 222, the method 200 comprises reading the POI object by the analysis application from the second data store.

At block 224, the method 200 comprises determining by the analysis application a number of different mobile communication devices that intersect with the POI based on comparing the route segments traversed by the mobile communication devices to the route segments associated with the POI object and based on the numeric weights associated to the identities of the route segments in the POI object, whereby a traffic flow at the geolocation of the POI is determined. The processing of block 224 comprises comparing the route segments traversed by the mobile communication devices to the route segments associated with the POI object. When a match occurs, this match is deemed a candidate intersection. The processing of block 224 may further analyze a plurality of intersections of the same mobile communication device with the POI that occur within a predefined window of time and deem these to be a single intersection rather than a plurality of intersections. The processing of block 224 may further take into consideration weight values associated with the routes defined by the POI object when determining the number of mobile communication devices that intersect the POI.

Figure 4:
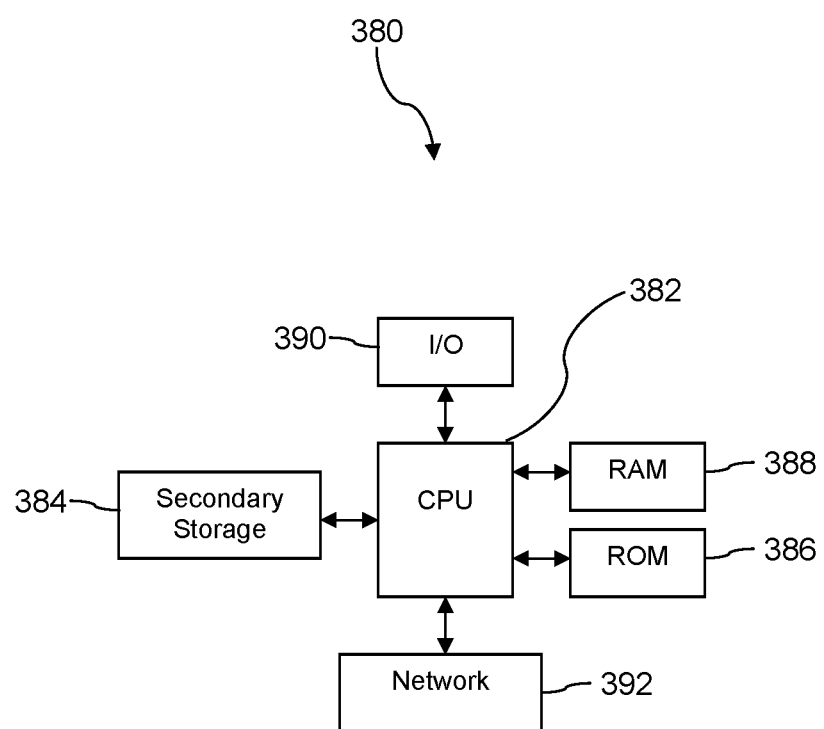
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A geolocating method, comprising:
    storing a map of travel routes in a first data store, where each travel route comprises a plurality of abutting route segments;
    presenting a user interface on a display screen by a point-of-interest (POI) definition application executing on a computer system, where the user interface shows at least some of the route segments overlaid on a map identifying street names and directions;
    receiving input, by the POI definition application, that defines a perimeter of a POI;
    determining, by the POI definition application, route segments contained within the perimeter of the POI and selected from among the plurality of abutting route segments;
    creating a POI object, by the POI definition application, that comprises identities of the route segments contained within the perimeter of the POI, whereby a geolocation of the POI is defined;
    presenting, in the user interface on the display screen by the POI definition application, the route segments associated with the POI object with an appearance that contrasts with the other route segments;
    receiving input, by the POI definition application, that defines a numeric weight for at least some of the route segments associated with the POI object;
    storing the numeric weights in the POI object, by the POI definition application, associating each numeric weight to a corresponding route segment identity;
    storing the POI object, by the POI definition application, in a second data store;
    for each of a plurality of mobile communication devices, determining route segments traversed by the mobile communication device based on geolocations of the mobile communication device by an analysis application executing on the computer system, wherein the geolocations of the mobile communication device are determined by performing trilateration processing on a plurality of received signals;

reading the POI object, by the analysis application, from the second data store;

determining, by the analysis application, a number of different mobile communication devices that intersect with the POI based on comparing route segments traversed by the mobile communication devices to the route segments associated with the POI object and based on the numeric weights associated to the identities of the route segments in the POI object; and determining, by the analysis application, a traffic flow at the geolocation of the POI.

2. The geolocating method of claim 1, wherein the POI is one of a billboard, a building, or a presentation screen.

3. The geolocating method of claim 1, wherein the travel routes comprise highway routes, light rail routes, and foot path routes.

4. The geolocating method of claim 1, wherein the geolocations are represented as geohashes or as latitude-longitude coordinates.

5. The geolocating method of claim 4, wherein the geolocations comprise a time-date value.

6. The geolocating method of claim 1, wherein the mobile communication devices are selected from the group consisting of mobile phones, smart phones, headset computers, wearable computers, laptop computers, notebook computers, and tablet computers.

7. The geolocating method of claim 1, wherein the route segments traversed by the mobile communication devices and the route segments associated with the POI object are associated with tiles, and determining the number of different mobile communication devices that intersect with the POI is further based on the tiles of the route segments traversed by the mobile communication devices and the tiles of the route segments associated with the POI object.

8. A geolocating system, comprising:
at least one processor;
a non-transitory memory;
a data store comprising a map of travel routes, where each travel route comprises a plurality of abutting route segments;
a point-of-interest (POI) definition application stored in the non-transitory memory that, when executed by the at least one processor:
presents a user interface on a display screen, where the user interface shows at least some of the route segments overlaid on a map identifying street names and directions,
receives input that defines a perimeter of a POI;
determines route segments contained within the perimeter of the POI and selected from among the plurality of abutting route segments;
creates a POI object that comprises identities of the route segments contained within the perimeter of the POI, whereby a geolocation of the POI is defined, and
stores the POI object in the data store;
an analysis application stored in the non-transitory memory that, when executed by the at least one processor:
for each of a plurality of mobile communication devices, determines route segments traversed by the mobile communication device based on geolocations of the mobile communication device, wherein the geolocations of the mobile communication device are determined by performing trilateration processing on a plurality of received signals;
reads the POI object from the data store;
determines a number of different mobile communication devices that intersect with the POI based on comparing route segments traversed by the mobile communication devices to the route segments associated to the POI object; and
determines a traffic flow at the geolocation of the POI.

9. The geolocating system of claim 8, wherein the travel routes comprise highway routes, light rail routes, and foot path routes.

10. The geolocating system of claim 9, wherein the POI definition application receiving input that defines the perimeter of the POI comprises receiving a first input defining the perimeter of the POI with reference to the highway routes, receiving a second input defining the perimeter of the POI with reference to the light rail routes, and receiving a third input defining the perimeter of the POI with reference to the foot path routes.

11. The geolocating system of claim 8, wherein the analysis application is executed periodically.

12. The geolocating system of claim 11, wherein the analysis application is executed daily.

13. The geolocating system of claim 8, wherein the geolocations are represented as geohashes or as latitude-longitude coordinates.

14. The geolocating system of claim 8, wherein the mobile communication devices are selected from the group consisting of mobile phones, smart phones, headset computers, wearable computers, laptop computers, notebook computers, and tablet computers.

15. A geolocating method, comprising:
storing a map of travel routes in a first data store, where each travel route comprises a plurality of abutting route segments;
presenting a user interface on a display screen, by a point-of-interest (POI) definition application executing on a computer system, where the user interface shows at least some of the route segments overlaid on a map identifying street names and directions;
receiving input, by the POI definition application, that defines a perimeter of a POI;
determining, by the POI definition application, route segments contained within the perimeter of the POI and selected from among the plurality of abutting route segments;
creating a POI object, by the POI definition application, that comprises identities of the route segments contained within the perimeter of the POI, whereby a geolocation of the POI is defined;
storing the POI object, by the POI definition application, in a second data store;
for each of a plurality of mobile communication devices, determining route segments traversed by the mobile communication device based on geolocations of the mobile communication device by an analysis application executing on the computer system, wherein the geolocations of the mobile communication device are determined by performing trilateration processing on a plurality of received signals;
reading the POI object, by the analysis application, from the second data store;
determining, by the analysis application, a number of different mobile communication devices that intersect with the POI based on comparing route segments traversed by the mobile communication devices to the route segments associated to the POI object; and
determining, by the analysis application, a traffic flow at the geolocation of the POI.

16. The geolocating method of claim 15, wherein the input received by the POI definition application is a drawing input.

17. The geolocating method of claim 15, wherein the POI definition application is a web application.

18. The geolocating method of claim 15, further comprising:
- presenting, in the user interface on the display screen by the POI definition application, the route segments associated with the POI object with an appearance that contrasts with other route segments; and
- receiving input, by the POI definition application, that requests removing a route segment from the POI object.

19. The geolocating method of claim 18, further comprising receiving input, by the POI definition application, that requests adding a route segment to the POI object.

20. The geolocating method of claim 15, wherein the geolocations are represented as geohashes or as latitude-longitude coordinates.

\* \* \* \* \*